United States Patent

[11] 3,533,481

| [72] | Inventor | Owen Paelian |
| | | 903 Corinth Circle S.E., Huntsville, Alabama 35801 |
| [21] | Appl. No. | 765,259 |
| [22] | Filed | Oct. 4, 1968 |
| [45] | Patented | Oct. 13, 1970 |

[54] VEHICLE WEIGHING SYSTEM
8 Claims, 6 Drawing Figs.
[52] U.S. Cl. .................................................. 177/134, 177/210; 73/141A
[51] Int. Cl. ............................................... G01g 19/02
[50] Field of Search ........................................ 177/133 −135, 211, 253, 254, 257; 73/141(A)

[56] References Cited
UNITED STATES PATENTS

| 2,962,274 | 11/1960 | Thurston | 177/134X |
| 2,962,275 | 11/1960 | Thurston | 177/134X |
| 2,962,276 | 11/1960 | Thurston | 177/211X |
| 3,266,584 | 8/1966 | Lee | 177/134 |
| 3,474,875 | 10/1969 | Laimins | 177/134 |

*Primary Examiner* — Richard B. Wilkinson
*Assistant Examiner* — George H. Miller, Jr.
*Attorney* — C. A. Phillips

ABSTRACT: A weighing system for weighing trucks while in motion having a plurality of adjacent but independent weighing platforms for each wheel or set of wheels wherein a portion of wheel loading of one wheel may be applied to one platform and a portion to another platform, or all to one platform without introducing weighing errors.

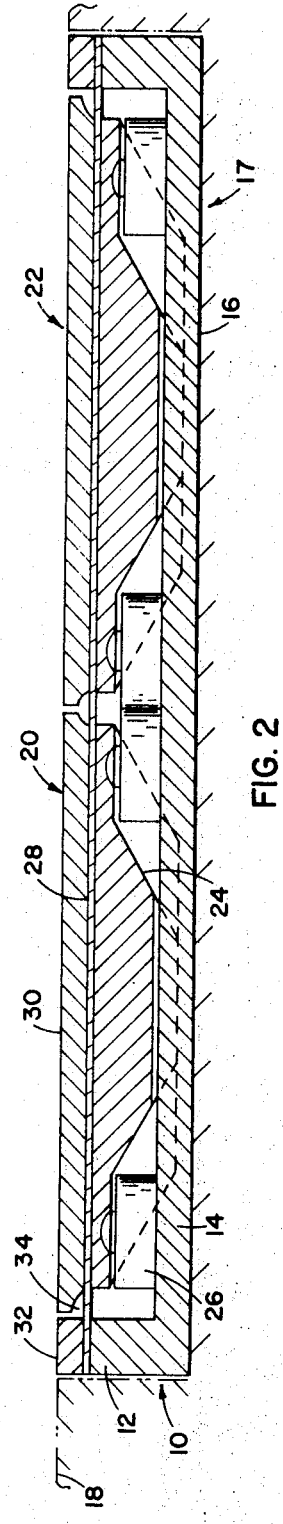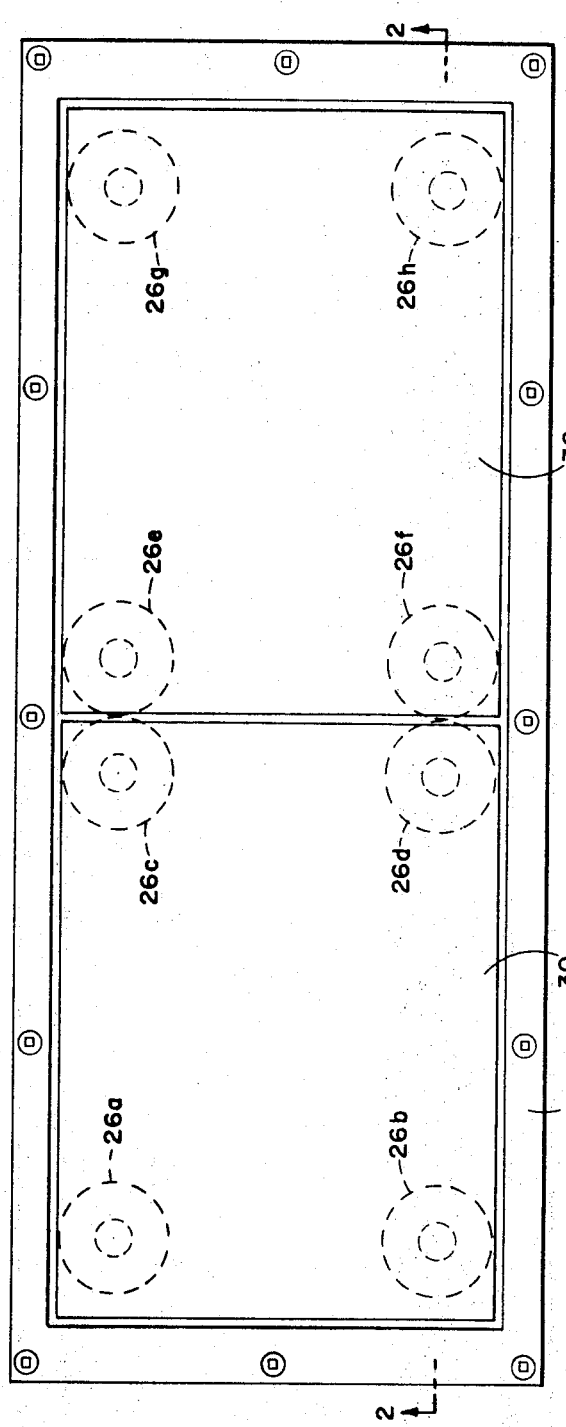

Owen Paelian, INVENTOR.

Owen Paelian,
INVENTOR.

BY

ATTORNEY.

VEHICLE WEIGHING SYSTEM

The present invention relates to weighing devices and systems and particularly to a weighing system for accurately and rapidly weighing standing or moving vehicles.

For several years significant efforts have been made to successfully develop scales or weighing device or system which could be installed in a roadway and provide accurate weighing of vehicles coming to a halt on it or traveling over it at speeds ranging up to 70 miles per hour. As is well know, the usual method of vehicle weighing is to provide a special traffic lane off to the side of a main roadway and wherein trucks must be brought to a halt to be weighed, thus causing very costly delays in transportation. Certain of the efforts to achieve weighing of moving vehicles are desribed in Lee U.S. Pat. No. 3,266,584, Porter U.S. Pat. No. 2,764,399 and Thurston U.S. Pat. No. 2,962,274.

A number of problems have required solution in the perfection of the desired weighing system and it is believed that previous efforts have failed.

A basic problem appears to be that of preventing inconsistencies, thus errors, in weighing by virtue of vehicles taking different paths over weight sensing platforms in roadway. It is, of course, impossible to restrict the passage width of a roadway carrying large truck vehicles at say up to 70 miles per hour to just the width of the truck to, ideally, cause the trucks to contact precisely the same area of weighing platform each time.

Accordingly, it is an object of the present invention to overcome the aforesaid and other difficulties experienced with prior systems and to provide an improved roadway weighing system which will accurately and consistently provide weight measurements of vehicles passing over the system although following different paths across the system.

In accordance with the present invention, a vehicle weighing system is constructed of two or more adjacent but independent weighing platforms, each weighing platform being of a width, width being measured in the direction of width of a roadway, of approximately the maximum width of a wheel or wheels of a vehicle on one side of a vehicle, usually two wheels. Each weighing platform is supported by a plurality, usually four, weighing elements such as load cells, which provide an electrical output proportional to applied weight. The platforms are laterally connected together and to a surrounding foundation member by a thin diaphragm which allows vertical forces to be applied to the separate platforms without significant attenuation but prevents lateral forces or components of lateral forces from being applied to the platforms. The result is that in the system of the present invention the individual weighing platforms are laterally stabilized to prevent lateral forces from moving vehicles from injecting weighing errors and are vertically decoupled to prevent cantilever loading which occurs in certain prior systems and wherein a depression on one weighing element produces a rise—negative weighing—force on another weighing element. Thus, when individual weighing elements are totaled or added, they will produce incorrect weight totals. In the applicant's system, however, this does not occur and the weight outputs from the weighing elements of each weighing platform are accurately combined to read out the sum of forces actually applied to all platforms.

These and other objects, features and advantages of the invention will become more apparent from the following detailed description of an embodiment of the invention when considered together with the accompanying drawings in which:

FIG. 1 is a plan view of an embodiment of the invention;

FIG. 2 is a sectional view along the lines 2-2 of FIG. 1;

Figure 4:
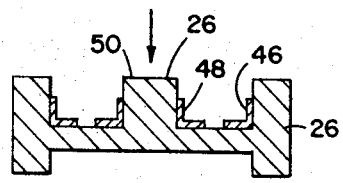
FIG. 4 is a sectional view of a load cell of the type employed in the weighing system of this invention.

Referring to the drawings there is shown a basic rectangular foundation member 10, which may be a single metal casting, having end sections 12, side sections 14, and bottom section 16 of a complete weighing unit 17. It is constructed to be mounted in a roadway 18 and to support a plurality of weighing platforms 20 and 22. Each platform includes a rigid and massive weight receiving base 24 which is rectangular and is supported at each corner by a load cell 26, individually designated 26a—26h. Load cells 26, more particularly illustrated in FIG. 4, are devices which provide an output electrical characteristic which is proportioned to applied force and thus, provides means for electrically reading out weight and are further described below.

As a particular feature of this invention, diaphragm 28, constructed of thin metal or other flexible material, connects and laterally supports platforms 20 and 22 with respect to foundation 10. Diaphragm 28 also interconnects and laterally stablizes platforms 20 and 22 with respect to each other. A wear plate 30 is mounted on top of each of platforms 20 and 22, separated for mounting purposes by diaphragm 28. Edge wear strips 32 are mounted on the four top sides of foundation 10 and provide with the surrounding road surface and wear plates 30 a flush surface for vehicles to roll over and provide replaceable member which as they wear can be replaced. Void 34 is filled with a flexible rubber compound, not shown, to prevent moisture from entering the system and preventing rocks and other foreign matter from interferring with the operation of diaphragm 28. Base members 24 each have a larger vertical cross section in the region between load cells in order to provide additional rigidity and assist in preventing the transmission of other than vertical forces to load cells 26.

Figure 5:
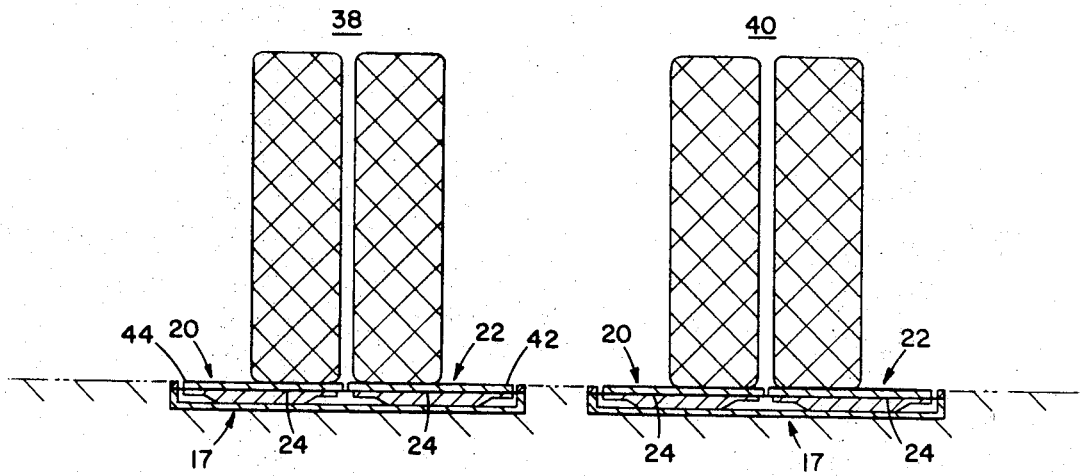
FIG. 5 is a diagrammatic view illustrating the placement of the weighing units of this invention in a roadway.
Figure 6:
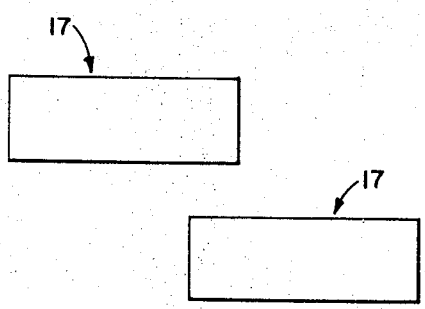
FIG. 6 is a diagrammatic view of a second scheme of placement of weighing units of this invention in a roadway.

Typically, two identical weighing unit 17, as described above, would be placed side by side in a roadway as shown in FIG. 5 and positioned for one to receive wheels 38 on one side of a vehicle and the other to receive wheels 40 on the other side of a vehicle. Alterably they would be staggered as shown in FIG. 6 and thus assuring that wheels on at least one side of a vehicle would pass over a weight responsive area regardless of the path the vehicle takes on the roadway. The width of each weighing unit corresponds to approximately twice the width of a set of dual wheels, or approximately 20 inches with each platform of each unit being of approximately the width of a set of the wheels, permitting width leeway in passage of a vehicle such that one set of wheels 38 or 40 could pass over either platform 20 or 22 of one of weighing units 17. Then when totally on one of the platforms, say platform 20, platform 20 of one unit will register all of the weight presented by one set of wheels as a platform 20 is depressed. Normally the weight distribution of truck will be such that weighing of wheel loading of one side of a truck will provide data from which total weight may be accurately computed.

The significant point is that the depression of one of the platforms will not have any effect on the other platform, in as much as the platforms are coupled solely by diaphragm 28. In other words, there is no tendency for platform 22 to be elevated at one end, for example at end 42, by virtue of depression at end 44. Further, lateral forces produced by the movement of wheels on the platforms are not transmitted to the load cells by virtue of the lateral support provided by diaphragm 28 (FIG. 2). In order to provide this desired characteristic of lateral rigidity, but vertical flexibility, diaphragm 28 typically is constructed of metal sheet such as high strength aluminum of .020 to .040 inches in thickness, a thickness which is small compared to the distance between the members it interconnects, that is between platforms 20 and 22 and between the platforms and foundation 10. Although only two platforms are illustrated in a single weighing unit it is to be appreciated that more than two such platforms may be employed where it is desired to extend the path over which a vehicle could pass. For example, if it were desired to permit a vehicle to provide a path width for a given wheel assembly of three times the wheel width assembly, then three platform assemblies would be employed in each weighing unit.

Figure 3:
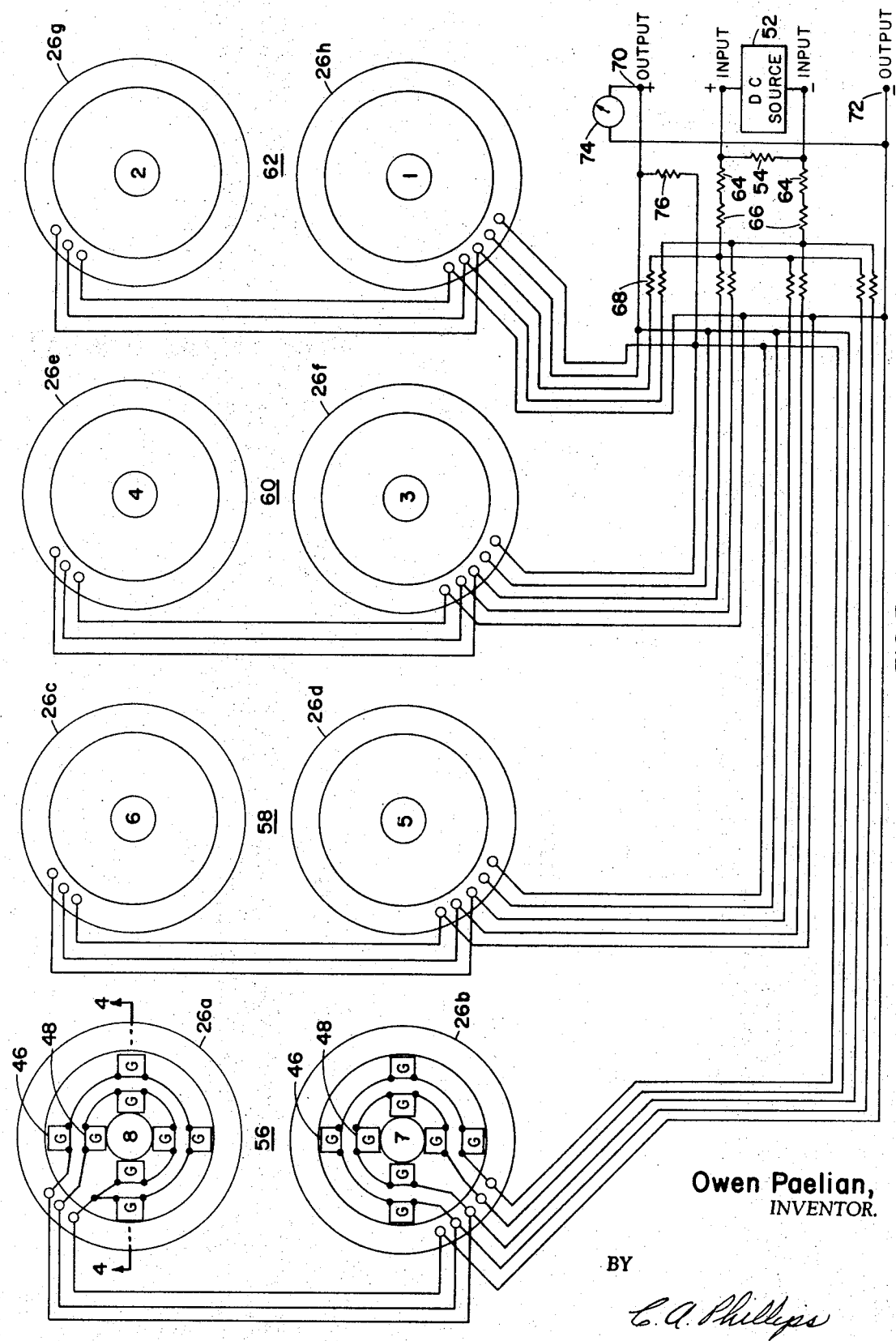
FIG. 3 is an electrical schematic diagram of the electrical system of the invention.

Referring to FIG. 3, wherein there is shown the electrical interconnection of load cells and the electrical system for the electrical readout of weights. The load cells are connected in pairs, load cells 26a and 26b forming one pair and load cells 26c and 26d forming a second pair wherein these two pairs support weighing platform 20. Similarly, a first pair of load cells 26e and 26f and a second pair of 26g and 26h support platform 22. Each pair is parallel with and in line with the other pairs, and as illustrated in FIG. 5, the weighing system is arranged so that the path of a vehicle is along a line which is parallel with a line connecting the axis of each two load cells of a given pair so that each load cell of a pair receives the same load. This enables the interconnection of two load cells to form a single electrical bridge, and as is shown, outer strain gauges 46 of load cells 26a and 26b, which decrease in resistance with applied load are connected to form two opposite legs of a bridge and inner-strain gauges 48, which increase in resistance with applied load, are connected to form the remaining two opposite legs of a bridge. Similarly, the strain gauges of the second pair of load cells 26c and 26d, third pair of load cells 26e and 26f and fourth pair of load cells 26g and 26h are interconnected to provide bridge circuits. Then all four bridge circuits are connected in parallel.

It will be noted that four outer and four inner-strain gauges are employed in each load cell and that all outer-strain gauges are in series and all inner-strain gauges are in series. It is, of course, to be appreciated that the number of such gauges may vary. The geometry of a given load cell is more particularly illustrated in FIG. 4 wherein it is to be noted that the outer-strain gauges 46 would be caused to expand with force applied to region 50, which receives loading from a base member 24. Inner-strain gauges 48 are caused to contract with the application of force and their resistance decreases with applied force.

Direct current source 52 across which is connected input impedance balancing resistor 54, provides power to bridge circuits 56, 58, 60 and 62 through final trim transducer sensitivity resistors 64 and temperature compensating resistors 66 and individual bridge circuit sensitivity trim resistors 68.

The composite voltage output of the four bridges appears between terminals 70 and 72 and is read out as a voltage calibrated in terms of weight on a read out device 74 which may be digital volt meter or digital printer or other type of desired weight indicator. Resistor 76 serves as a final bridge balancing resistor.

While the invention has been generally discussed and illustrated with respect to the employment of a plurality of rectangular platforms employing a plurality of pairs of load cells, it is to be appreciated that a substantial improvement over prior systems will be achieved wherein three or four load cells support a single platform and the platform is stabilized by means of a thin diaphragm as illustrated. It is significant that the diaphragm will be rigidly attached to a weighing platform and not merely providing a top cover for a platform. Where the geometry of platform permits, three load cells rather than four load cells provide an excellent arrangement of support in that only three supporting points are necessary to define a plane and when the fourth one is employed, which is necessary in many configurations, the fourth point of support must carefully align with the other three.

In operation, as a vehicle passes over the weighing platforms, the wheel loading from at least one side of a vehicle would be indicated by a weighing unit 17. As stated above, with the system of this invention, a vehicle may take varying paths across the weighing surfaces of the system without significantly effecting the weighing accuracy, a distinct improvement over previous devices for weighing automotive vehicles in motion on a highway.

I claim:
1. A vehicle weighing system comprising:
   A. A rectangular foundation member;
   B. A plurality of adjacent weighing assemblies, each comprising:
      1. a weighing platform;
      2. a plurality of weighing elements supported by said foundation member and in turn supporting said platform; and
   C. A flexible diaphragm supported by said foundation member and attached to said weighing platforms for transmitting vertical forces to said platforms, and retarding the application of lateral forces to said platforms, and wherein said platforms are intercoupled solely by said diaphragm whereby bearing forces applied to one platform do not couple tension forces to adjacent platforms;
   D. Summing means connected to said weighing elements for providing a total of the weight sensed by the weighing elements.

2. A vehicle weighing system as set forth in claim 1 wherein said platforms are separated from each other and from said rectangular foundation member by said diaphragm and by a distance which is large with respect to the thickness of said diaphragm.

3. A weighing system as set forth in claim 2 wherein each said weighing platform is supported by four said weighing elements.

4. A weighing system as set forth in claim 3 wherein said weighing elements are electrically responsive elements.

5. A weighing system as set forth in claim 4 wherein said platforms are rectangular, are supported at corners by said weighing elements and have an enlarged mass in the region between weighing elements.

6. A vehicle weighing system as set forth in claim 5 wherein:
   A. Said weighing elements are load cells, each having at least two strain sensitive resistant elements, one being positioned to increase in resistance with applied load and the other, being positioned to decrease in resistance with applied load; and
   B. Said load cells being electrically connected in pairs wherein resistance elements of a first load cell which increase in resistance with applied load form with resistance elements of the second load cell of that pair which likewise increase in resistance with applied load opposite legs of an electrical bridge and resistance elements of said load cells which decrease in resistance with applied load form, respectively, the other two opposite legs of said electrical bridge.

7. A vehicle weighing system as set forth in claim 6 wherein said load cells comprising a given said pair of load cells are positioned parallel with all other said pairs of load cells.

8. In a weighing system, the combination comprising:
   A. A foundation member;
   B. A weighing platform;
   C. A plurality of electrically responsive weighing elements supported by said foundation and in turn supporting said weighing platform;
   D. A flexible diaphragm rigidly attached to said foundation member and rigidly attached to said weighing platform for transmitting vertical forces to said platform and retarding the application of lateral forces to said platfrom; and
   E. Indicating means responsive to an electrical output from said weighing elements for indicating the sum of weight sensed by said weighing elements.